United States Patent [19]
Ganho
[11] Patent Number: 4,536,218
[45] Date of Patent: Aug. 20, 1985

[54] PROCESS AND COMPOSITIONS FOR LITHOGRAPHIC PRINTING IN MULTIPLE LAYERS

[76] Inventor: Eli A. Ganho, 112 Snidercroft Rd., Unit 8, Concord, Ontario, Canada, L4K 2K1

[21] Appl. No.: 578,556

[22] Filed: Feb. 8, 1984

Foreign Application Priority Data

Feb. 9, 1983 [CA] Canada .......................................... 421252

[51] Int. Cl.[3] ........................ C04B 31/18; C08K 3/08; C09C 1/62; C09D 5/10

[52] U.S. Cl. ................................ 106/290; 101/450.1; 101/452; 106/307; 106/310; 106/316; 106/300; 427/258; 428/499; 524/270; 524/271; 524/272; 524/273; 524/274; 524/284; 524/313; 524/441; 524/477; 524/478; 524/764; 524/798; 527/600; 8/2; 8/62

[58] Field of Search ............... 106/290, 300, 307, 310, 106/316; 427/258; 428/499; 524/270–274, 284, 313, 441, 477–478, 764, 798; 527/600

[56] References Cited

U.S. PATENT DOCUMENTS 3,944,695 3/1976 Kosaka et al. ...................... 428/200
4,162,997 7/1979 Walsh ................................. 524/272
4,225,475 9/1980 Carumpalos ........................ 524/271
4,244,866 1/1981 Schefbauer .......................... 524/270
4,279,659 7/1981 Unmuth .............................. 106/230
4,472,537 9/1984 Johnson et al. ..................... 524/272
4,488,646 12/1984 McCorkle ........................... 524/274

*Primary Examiner*—Herbert S. Cockeram
*Attorney, Agent, or Firm*—Browdy and Neimark

[57] ABSTRACT

Printed materials such as tickets, lottery forms, cards and contest forms, bearing a hidden message which is revealable by scratching off a covering opaque layer, are prepared by printing the message on the substrate, lithographing a protective layer such as a clear varnish or a pigmented varnish-ink over the hidden message, and then lithographing a hiding coat over the applied protective layer. The protective layer formulation and the hiding coat layer are both based upon compatible, preferably the same, film forming resin systems, and are deposited from a common solvent. The protective layer may provide a clear, colorless transparent film through which the message may be viewed, or a colored see-through layer, so that it constitutes one color layer also for the printing of other areas of the substrate.

4 Claims, No Drawings

PROCESS AND COMPOSITIONS FOR LITHOGRAPHIC PRINTING IN MULTIPLE LAYERS

FIELD OF THE INVENTION

This invention relates to printing methods and printing ink compositions. More particularly, it relates to methods and compositions for making sheets such as paper sheets or cards covered with superimposed layers of print, the lower of which comprises a "hidden" message which is masked from a reader unless and until an upper coating is removed, e.g. by abrasion, scratching and erasures.

BACKGROUND OF THE INVENTION

Recently, the preparation and distribution of promotional game cards, premium cards, lottery tickets and the like, containing hidden messages or symbols has become popular and widespread, in fund raising and product promotion. The recipient of such a card must remove from the card a layer of hiding coating in order to reveal a message or symbol. Such items are, however, difficult to prepare and print in an economical fashion, because of the technical specifications they must fulfill.

Such a card bearing a hidden message normally has at least two coating layers overlying a hidden message. Immediately over the message, a transparent or translucent protective layer is provided, through which the message can be read. Over the protective layer, an opaque second layer ("hiding layer") is applied in order to hide the message. The hiding layer can be subsequently stripped away e.g. by scratching etc., to reveal the message through the first coat.

It is necessary that there exists, as between the protective coat or layer and the hiding coat or layer an acceptable degree of adhesion or affinity, so that the hiding coat remains in place and opaque to hide the message during storage, shipping, packaging and transportation of the cards. Nevertheless, the hiding coat ("scratch-off coat") must be readily removable by abrasion by the user at the required time, to render the message visible, leaving the first coat susbtantially unaffected.

Effectively, one must satify two essentially contradictory requirements in the relationship between the varnish coat and the hiding coat, to render them mutually compatible and adhesive to one another at one time, and imcompatible and non-adhesive to one another at another time.

Heretofore, these mutually inconsistent requirements have been satisfied by using a thick hiding coat applied by silk screen methods, over a thin varnish coat applied by lithographic methods or by silk screen methods. In view of its thickness and consistency, the only practical way of applying the hiding coat is by silk screening. This is costly and inconvenient. Lithography is the cheapest, fastest way of printing and applying coatings to such cards. To have to apply one coating by lithography and the other coating by silk screening entails the transfer of the card stock from one printing machine to another, or even the transferring from one printing plant to another printing plant, with consequent added inconvenience, extra expense and loss of security.

SUMMARY OF THE INVENTION

The present invention provides an improved process for preparing printed or coated cards or similar items bearing hidden messages under a layer of protective coat and a layer of hiding coat superimposed thereon. In the process of the present invention, both the protective coat and the hiding coat may be applied to the card lithographically. To facilitate this, the protective coat formulation and the hiding coat formulation are deposited from compatible solvent sysytems and contain mutually compatible resin systems. Then the hiding coat, containing opacifying pigments, can be applied as a thin layer, suitably formulated to be applied by lithography, and still exhibit the necessary hiding power whilst being abrasively removable. In addition, if desired, further printing of patterns can be applied over the hiding coat.

DESCRIPTION OF THE PREFERRED EMBODIMENTS

The protective coat formulation and the hiding coat formulation have film-forming resin systems which are mutually compatible. Preferably they comprise generally the same resins or types of resins in both formulations. The protective coat formulation may comprise a pigment free varnish, so as to produce a light coloured translucent or transparent film when dried and cured in place to reveal the message below. Alternatively and preferably however, the protective coat is pigmented with a light coloured pigment so that it may constitute one of the printing colour formulations for application to other areas of the substrate, so as to save one application step in the process. As compared with varnish previously used for this purpose, the protective coat used in the present invention has a higher energy surface, less repellant to and compatible with the pigmented hiding coat. The protective coat formulation contains curatives (hardeners) which will result in the formulation of a hard, cured film, but which is not so hard as to reject the application of the hiding coat. The hiding coat preferably contains the same or similar film forming resin system, but is cured to a lesser degree. The relative degree of cure between the two layers helps to adjust the degree of adhesion between them tending to fulfill the contradictory requirements mentioned above, and permits the scratch-off removal of the hiding coat.

Preferably, the hiding coat contains pigments or opacifying agents which render the finished coat not only visibly opaque but also opaque to all other forms and wavelenghts of radiation also so that the hidden message cannot be prematurely revealed e.g. by x-rays, UV light etc. For this purpose the hiding coat formulation should contain a powdered metal such as powdered aluminum, in addition to regular pigments such as carbon black, dyes etc.

Examples of suitable resins for use in both the protective coat (clear or pigmented varnish-ink formulation) and the hiding coat formulation are phenolic resins such as phenolic modified rosin esters, hydrocarbon resins, alkyd resins such as linseed-isophthalic alkyd and other unsaturated alkyds resins and the like, and mixtures thereof. Such resin systems are curable with heavy metal-organic salt such as manganese octoate and cobalt octoate, to yield the light coloured or transparent films. They can be plasticised if desired, e.g. with waxes of the hydrocarbon type. When a clear varnish is required, the varnish formulation should of course be free from pigments, but may contain other ingredients in minor proportions to modify its surface properties. For example, small amounts of Montan wax, Carnuaba wax or another natural or synthetic wax of similar characteristics, can be added to give a harder surface finish. Such a wax component may in fact migrate to the surface of the coating after curing ("bloom") and then contribute to the surface characteristics of the cured varnish layer. When a pigmented varnish-ink is required, a conventional pigment compatible with the solvent and resin formulation is used therein. The hiding coat formulation should include a drying oil such as refined linseed oil, and smaller amounts of curative, along with opacifying agents, to yield a film of suitable hiding qualities and compatibility with the protective film, yet readily abrasively removable therefrom.

As noted, both the protective layer formulation and the hiding coat formulation should be deposited from compatible solvent sytems, preferably from the same solvent system. Hydrocarbon solvents (e.g. Magie oil, a mixture of aliphatic and aromatic oils) are preferred. The protected layer formulation will normally contain substantially larger proportions of solvent, and hence be of substantially thinner consistency, than the hiding coat formulation. Both formulations are nevertheless of a suitable consistency for application by lithography. The solvent used for the hiding coat should not be capable of penetrating the cured protective layer coat to any significant extent, despite the fact that the very same solvent may well have constituted the vehicle for deposition of the uncured protective layer. Accordingly, a fast drying system is chosen, which cures to a hard finish to prevent solvent and pigment penetration thereof from the hiding coat, but which nevertheless "traps" the subsequently applied hiding coat to the necessary degree.

In order to be satisfactory for lithographic application, an ink formulation must be adjusted in relation to the printing machine speed, to adjust its rate of drying and curing. On a high speed machine, the amount of heat generated by the machine may cure the protective layer formulation to such an extent the the applied layer will not transfer from the plate cylinder to the rubber blanket cylinder and on down the roller train. Accordingly, depending upon the speed and nature of the lithographic printing machine by means of which the protective layer is to be applied, it may be necessary to retard the drying or hardening of the rate of the protective layer as compared with the normal varnishes. This is most commonly encountered when using clear, non-pigmented varnishes in the present invention as the hiding coat. When a slower speed of machine is employed, such retardation may not be necessary.

The following is a preferred general formulation for a clear, non-pigmented varnish for use as the protective layer in the present invention particularly for use with fast running web litho printing machines, with the ingredients expressed as percentages by weight.

| Components | % Range |
|---|---|
| Magie oil (solvent) | 30–35 |
| Phenolic modified rosin ester | 16–20 |
| Hydrocarbon resin (e.g. of the PICCOPALE* type) | 13–17 |
| Linseed-isophthalic alkyd | 10–13 |
| Hydrocarbon plasticizer (e.g. of the DUTREX* type) | 7–10 |
| Montan wax | 3–6 |
| Calcium perborate | 1.5–3 |
| Manganese octoate | 1.5–2 |
| Cobalt octoate | 0.5–1 |
| Gelling agent | 0.5–0.7 |

-continued

| Components | % Range |
|---|---|
| Chinawood oil | 0.3–0.5 |

*Trade mark

In this formulation, cobalt octoate, manganese octoate and calcium perborate constitute the curing system. The calcium perborate helps to cure the chinawood oil, by supplying oxygen thereto. Similar hydrocarbon flexibilizer may be used in place of DUTREX as the plasticizer. Also similar hydrocarbon rosins may be used in place of PICCOPALE. The chinawood oil (tung oil) is optionally added, to adjust the consistency and tackiness of the surface. The gelling agent also adjusts the consistency of the formulation. As gelling agent, there can be used any suitable product from the reaction of an unsaturated fatty acid, a solvent and calcium octoate. Alternatively, thickener such as fumed silica may be used as or instead of a gelling agent.

For clear varnish application using a slower, sheet fed machine, such a varnish might not result in a coating which would satisfactorily trap the hiding coat. The above formulation would accordingly be modified for example, by reducing or omitting one or more of the gelling agents, calcium perborate, chinawood oil, wax or hydrocarbon resin.

In the preferred process according to the present invention, the card or paper stock is initially printed, in a first colour, with the indica to be subsequently covered with the "scratch-off" hiding coat (the "hidden message") at the appropriate location, lithographically. At the same time and from the same plate, any other areas of the stock may be appropriately printed with the same colour, e.g. with text, picture, design, etc. Normally, the first colour will be the darkest colour to be applied, e.g. black or dark blue. The ink composition used for the first lithographic application step may be of the composition according to the invention, i.e. a varnish-ink, or a standard conventional lithographic ink suited to the base stock.

In the next step of the preferred process, the stock is overprinted lithographically with a second colour, of a varnish-ink according to the invention, at least in the area of the "hidden message", as a solid block covering it. This second colour may be applied wet-on-wet over the first colour. Preferably it is restricted to cover only the area of the "hidden message", but may if desired be used to apply additional text or colour to other areas of the stock. Red is a suitable choice for the second colour. The "hidden message" is still readable through the applied second coat.

There then follow optional steps of lithographic application of additional colour, to complete the printing of the stock. If it is required to produce full-colour printing on the stock, e.g. with full colour illustration, two more colours, e.g. green and yellow, are applied successively, wet-on-wet, over the second colour by lithographic means. Thus a standard four-colour lithographic printing machine can be used. If any of the subsequently applied colours are to cover the "hidden message", then the composition of such colour must be a varnish-ink according to the present invention. It is however preferred to avoid further coating of the "hidden message" with the subsequently applied colours, so that they can be formulated according to standard lithographic ink formulation, compatible with the stock and the previously applied coats. It is however to be emphasized that the third and fourth colour applications are optional and not essential to the successful practice of the process of the invention.

After the desired number of colour coats have been thus lithographically applied, the printed stock is allowed to dry, and then the scratch-off hiding coat is applied lithographically to the "hidden message" area. Drying of the colour coats normally takes from 6-24 hours, so that the hiding coat application is conveniently conducted the following day. The hiding coat, for formulation previously described, is lithographically applied over the "hidden message" area, in one, two or three wet-on-wet applications using a standard lithographic plate and printing machine. Then the hiding coat is dried. It is found that the hiding coat successfully adheres to the coating over the "hidden message" so as to render it undecipherable, and is sufficiently adhesive and durable to withstand normal handling and transportation of the printed stock. Nevertheless, it can be readily scratched off, to reveal the "hidden message" through the coating of the second colour.

The varnish-ink formulation is as previously described, merely including a suitable amount of a suitable pigment in addition to the previously mentioned ingredients.

With regard to the curing and the drying of the pigmented varnish-ink, it has additionally been found that the pigmented varnish-ink can be cured in a minimum amount of time. Curing and drying of a pigmented varnish under an infra-red energy source can be completed in as little as 30 minutes. This provides additional time savings for operations of this type.

In order to formulate the pigmented varnish of the present invention, 15-25% of the normal pigment (ink) vehicle usually employed in lithographic printing, is substituted by the varnish identified above. The varnish may be substituted in any colours of ink in order to formulate the pigmented varnish. In this way, a large number of colours may be used to print the message and any other pattern required on the card. A number of layers of differently coloured pigmented varnishes may be applied in sucession, in order to print a multicoloured pattern and/or message on the card. It is, of course, necessary that in such cases, the colour of the second layer and any additional layer be chosen so as to maintain visibility of the message printed by the first layer.

In formulating the pigmented varnish, the extent of the varnish substitution for normal ink vehicle is dependent on the colour sequence used in the printing process. It is most desirable that the uppermost layer of pigmented varnish contains a higher percentage of the varnish than the lower layers so as to provide optimum communication between the pigmented varnish and the hiding layer.

The following is a preferred general formulation for the pigmented varnish-ink for use in the present invention. The amounts of ingredients are expressed as parts by weight:

| Components | % Range |
|---|---|
| Magie oil (paraffin based solvent) | 20-28 |
| Phenolic modified rosin ester | 14-18 |
| Hydrocarbon resin (e.g. of the PICCOPALE* type) | 8-12 |
| Linseed isophthalic alkyd | 6-10 |
| Hydrocarbon plasticizer (e.g. of the DUTREX* type) | 6-8 |
| Isophorone diamine | 0.5-1.5 |
| Texanol isobutyrate | 2-5 |

-continued

| Components | % Range |
|---|---|
| Montan wax | 2-5 |
| Calcium perborate | 1-3 |
| Manganese octoate | 1-2 |
| Cobalt octoate | 0.5-1 |
| Gelling agent | 0.3-0.6 |
| Chinawood oil | 0.3-0.5 |
| Pigment | 16-25 |

*Trade Marks

It should be noted that the pigmented varnish may also be prepared by mixing known inks of desired colour directly with the varnish. In this case, it will be evident that dilution of the pigment will result. Additional pigment may be added to retrieve the original intensity of the ink, if desired.

Preferably, the hiding coat contains pigments or opacifying agents which render the finished coat not only visibly opaque but also opaque to all other forms and wavelengths of radiation also, so that the "hidden message" cannot be prematurely revealed e.g. by x-rays, UV light etc. For this purpose the the hiding coat formulation should contain a powdered metal such as carbon black, dyes etc.

A suitable such hiding coat is as follows, with the amounts of ingredients expressed as percentages by weight:

| Components | % Range |
|---|---|
| Titanium dioxide | 28-35 |
| Aluminum powder | 15-20 |
| Phenolic modified rosin ester | 15-18 |
| Linseed oil refined | 9-11 |
| Black pigment (carbon black) | 7-8 |
| Linseed-isophthalic alkyd | 5-8 |
| Magie solvent | 5-7 |
| Cobalt octoate | 0.5-1 |
| Chinawood oil | 0.5-1 |
| Hydrocarbon resin | 0.5-1 |
| Polyethylene wax | 0.3-0.5 |
| Fischer-Tropsch wax | 0.2-0.5 |
| Gelling agent | 0.5-1 |

The hiding coat formulations for use in the present invention may be the same as described above or may contain an additional ingredient. It has been found that incorporation of one or more species of long chain fatty amides, of which may be mentioned erucamide, erucyl stearamide and erucyl erucamide, will improve the scratch-off properties of the hiding coat without impairing its integrity during the normal handling and storage. Incorporation of the long chain fatty amides with the above mentioned hiding coat formulation in a preferred range of about 10-20% by weight has been found to provide easier removal thereof by abrasion by the user and improved clarity of the uncovered message.

It will be noted that the above hiding coat formulation has the same basic resin system and solvent as the clear varnish or the pigmented varnish-ink formulation. It differs, however, in the amount of solvent and hence consistency, in the amount of curing system, and in the presence of opacifying agents of those mentioned in the specific formulations. Other suitable unsaturated oils may be used instead of linseed oil, and instead of chinawood oil. The gelling agent is as described in connection with the pigmented varnish-ink coat. The presence of some such unsaturated oil is highly advantageous in providing the best "scratch-off" properties. The linseed-isophthalic alkyd resin in both the formulations is represented of a large variety of available such materials, and substantially any other unsaturated alkyd could be used instead. Isophthalics are preferred however.

The pigmented varnish-ink coat is suitably applied to a printed card stock by sheet fed or web lithograph methods. The aforementioned formulations are most suitable for sheet fed lithography. The consistency of the formulations needs adjustment to render them more suitable for web lithography.

The pigmented varnish-ink layers, suitably 2–4 in number, wherein each layer may be the same or a different colour, may be applied wet-on-wet, i.e. without waiting for the previously applied layer of pigmented varnish to dry and cure. The total pigmented varnish coat must however, as mentioned, be dried and cured before the hiding coat is applied. Then the hiding coat is also suitably applied to the stock, over the pigmented varnish, in one or several wet-on-wet layers, and then allowed to dry and cure.

The resulting hiding coat is durable not only to withstand normal storage and handling, but also to receive further overprintings and additional hiding layers, patterns or printed information, should this be required. The scratch-off portion can be readily removed by the user's fingernails, without abrasives, coins, files, erasers or the like, to show clearly the overprinted "hidden message".

The invention is further illustrated in the following specific examples.

EXAMPLE

The following specific pigmented varnish-ink formulation (a red ink) and hiding coat formulation were made up, with ingredients listed as weight percentages:

Red Varnish-Ink Formulation

| Components | % |
|---|---|
| Magie oil (paraffin based solvent) | 25 |
| Phenolic modified rosin ester | 15 |
| Hydrocarbon resin (e.g. of the PICCOPALE* type) | 14 |
| Linseed isophthalic alkyd | 8 |
| Hydrocarbon plasticizer (e.g. of the DUTREX* type) | 6 |
| Isophorone diamine | 1 |
| Texanol isobutyrate | 4 |
| Montan wax | 3 |
| Calcium perborate | 2.2 |
| Manganese octoate | 0.3 |
| Cobalt octoate | 0.5 |
| Gelling agent | 0.5 |
| Chinawood oil | 0.5 |
| Pigment (Permanent Carmine FBB02 (CI, 12485) | 20 |

*Trade Marks

Hiding Coat Formulation

| Components | % |
|---|---|
| Titanium dioxide (TIOXIDE*) | 32 |
| Aluminium powder | 18 |
| Phenolic modified rosin ester | 16 |
| Linseed oil refined | 10 |
| Black pignent (carbon black) | 8 |
| Linseed Isophthalic alkyd | 5 |
| Magie solvent | 6 |
| Cobalt octoate | 0.6 |
| Chinawood oil | 0.6 |
| hydrocarbon resin (PICCAPOLE* Type) | 1 |
| Polyethylene wax | 0.3 |
| Fischer-Tropsch wax | 0.3 |

-continued

Hiding Coat Formulation

| Components | % |
|---|---|
| Gelling agent | 0.6 |

*Trade Marks

The red varnish-ink formulation was applied, by sheet fed lithographically using a standard printing machine, to a card stock bearing indicia previously printed with a standard black ink known for use in lithographic printing. The card contained an area with a printed message which was to be hidden. The carmine pigmented-ink formulation was applied lithographically over the message area such that the entire message was covered by a solid rectangular block of the red varnish-ink. The message was clearly visible and legible through the red varnish-ink coat. The applied red varnish-ink coat was allowed to dry and cure for one way.

Next, using the same sheet fed lithographic printing machine, the hiding coat was applied directly over the cured varnish-ink coat. Four layers were applied, wet on wet, and then the hiding coat was allowed to dry.

The hiding coat so formed completely obliterated the underlying message. It was durable enough to withstand normal handling and packaging. Nevertheless, it was removable by scratching with a fingernail, to reveal the varnish coat substantially unaffected, through which the printed message was clearly visible.

EXAMPLE 2

By replacing the carmine pigment component in the varnish-ink formulation of example 1, black pigmented, yellow pigmented, and blue pigmented varnish-ink were prepared. The carmine varnish-ink was also prepared as per example 1.

Using the black-pigmented varnish-ink, a first layer was printed on a black substrate by a sheet-fed lithographic press having four printing stations in serial arrangement. This first black layer marked characters on the blank substrate including the indicia which were to be hidden, i.e. the "message".

The indicia-bearing substrate was passed, while still "wet" to a second pressing station on the same lithographic press where the carmine pigmented varnish-ink was applied such that the entire area encompassing the message was covered or "masked" by the carmine ink-varnish. Other areas were printed on the substrate at this same, station and with the same carmine pigmented varnish-ink in this printing step in order to add colour to the characters on the card outside the area containing the message. The masking provides a surface over the message which enables the hiding layer to be reversibly trapped within the area of the masking. The message was clearly visible and legible through the carmine layer.

A third layer of yellow-pigmented varnish-ink was then applied at the next station on the same lithographic press to the substrate on areas outside of the message area. This additional layer served to add colour to the characters on the face of the card.

To provide an even more colourful card the substrate was passed from the yellow-pigmented printing station to the fourth and final printing station on the press where the blue-pigmented varnish-ink was appropriately layered on areas outside the message area.

Although it is within the scope of the invention to apply either or both of the yellow and blue-pigmented varnishes into the masked area at the subsequent printing stations it will be realized that, since the carmine layer i.e. the first masking layer will fulfill the aforementioned requirements of releasably trapping the hiding layer, savings on ink consumed in the printing process can be obtained by omitting the application of more than one blocking layer.

After the final fourth layer was printed, the substrate was removed and allowed to cure until the next day. Means for reducing the curing time can be used to accelerate the curing process, if desired, such as an infra red energy source, etc.

The substrate with the cured varnish-ink layers was then introduced into a lithographic press having, again, four printing stations, each of which contained a hiding coat formulation as exemplified in example 1. The hiding coat was applied directly over the carmine pigmented area blocking the message at each successive station.

The layers were applied wet-on-wet. After passing through the press the card was removed and allowed to dry.

The following day, it was found that the hiding coat layer was completely removeable to reveal the hidden message by scratching with a fingernail.

EXAMPLE 3

The following specific varnish-formulation and the hiding coat formulation of example 1 were made up, with ingredients listed as weight percentages:

| VARNISH | |
|---|---|
| Components | % |
| Magie oil (solvent) | 32 |
| Pheaolic modified rosin ester | 18 |
| Hydrocarbon resin (e.g. of the PICCOPALE* type) | 16 |
| Linseed isophtholic alkyd | 10 |
| Hydrocarbon plasticizer (e.g. of the DUTREX* type) | 8 |
| Montan wax | 3.5 |
| Calcium perborate | 2.2 |
| Manganese octoate | |
| Cobalt octoate | 0.7 |
| Gelling agent | 0.5 |
| Chinawood oil | 0.7 |

*Trade Mark

The varnish formulation was applied, by sheet fed lithography using a standard printing machine, to a card stock previously printed with a message to be hidden. Three layers of applied varnish were applied successively, wet-on-wet and then the applied varnish was allowed to dry and cure. A light coloured, transparent film was formed, through which the underlying printed message was clearly visible and legible.

Next, using the same sheet fed lithographic printing machine, the hiding coat was applied over the cured varnish coat. Four layers were applied, wet-on-wet, and then the hiding coat was allowed to dry.

The hiding coat so formed completely obliterated the underlying message. It was durable enough to withstand normal handling and packaging. Nevertheless, it was removable by scratching with a fingernail to reveal the varnish coat substantially unaffected, through which the printed message was clearly visible.

Whilst according to the invention, it is preferred to apply the varnish-ink coat and the hiding coat lithographically, it is nevertheless possible to apply the varnish-ink coat by letterpress application and the hiding coat lithographically, thus retaining the principle advantage, of avoiding silk screen application. In such case, the hydrocarbon resin component is omitted from the varnish-ink formulation.

I claim:

1. A varnish composition suitable for lithographic application to a substrate to cover indicia printed thereon preparatory to hiding said indicia with an abrasively removable hiding coat, said composition including the following ingredients in the following approximate weight range:

| Components | % Range |
|---|---|
| Magie oil (solvent) | 30–35 |
| Phenolic modified rosin ester | 16–20 |
| Hydrocarbon resin | 13–17 |
| Linseed-[isophtholic] isophthalic alkyd | 10–13 |
| Hydrocarbon plasticizer | 7–10 |
| Montan wax | 3–6 |
| Calcium perborate | 1.5–3 |
| Maganese octoate | 1.5–2 |
| Cobalt octoate | 0.5–1 |
| Gelling agent | 0.5–0.7 |
| Chinawood oil | 0.3–0.5 |

2. A pigmented varnish-ink composition suitable for lithographic application to a substrate to cover indicia printed thereon preparatory to hiding said indicia with an abrasively removable hiding coat, said composition including the following ingredients in the following approximate weight range:

| Components | % Range |
|---|---|
| Magie oil (paraffin based solvent) | 20–28 |
| Phenolic modified rosin ester | 14–18 |
| Hydrocarbon resin | 8–12 |
| Linseed-isophthalic alkyd | 6–10 |
| Hydrocarbon plasticizer | 6–8 |
| Montan wax | 2–5 |
| Calcium perborate | 1–3 |
| Manganese octoate | 1–2 |
| Cobalt octoate | 0.5–1 |
| Gelling agent | 0.3–0.5 |
| Chinawood oil | 0.3–0.5 |
| Pigment | 16–25 |

3. A hiding coat composition suitable for lithographic application over a cured varnish coating as claimed in claim 1, and including the following ingredients in the following approximate weight ranges:

| Components | % Range |
|---|---|
| Titanium dioxide | 28–35 |
| Aluminum powder | 15–20 |
| Phenolic modified rosin ester | 15–18 |
| Linseed oil refined | 9–11 |
| Black pigment (carbon black) | 7–8 |
| Linseed-isophthalic alkyd | 5–8 |
| Magie solvent | 5–7 |
| Cobalt octoate | 0.5–1 |
| Chinawood oil | 0.5–1 |
| Hydrocarbon resin | 0.5–1 |
| Polyethylene wax | 0.3–0.5 |
| Fischer-Tropsch wax | 0.2–0.5 |
| Gelling agent | 0.5–1 |

4. A hiding coat suitable for lithographic application over a cured pigmented varnish-ink composition according to claim 2, and including the following ingredients in the following approximate weight range:

| Components | % Range |
| --- | --- |
| Titanium dioxide | 28–35 |
| Aluminum powder | 15–20 |
| Phenolic modified rosin ester | 15–18 |
| Linseed oil refined | 9–11 |
| Black pigment (carbon black) | 7–8 |
| Linseed-isophthalic alkyd | 5–8 |

-continued

| Components | % Range |
| --- | --- |
| Magie solvent | 5–7 |
| Cobalt octoate | 0.5–1 |
| Chinawood oil | 0.5–1 |
| Hydrocarbon resin | 0.5–1 |
| Polyethylene wax | 0.3–0.5 |
| Fischer-Tropsch wax | 0.2–0.5 |
| Gelling agent | 0.5–1 |

* * * * *